United States Patent
Schroeder et al.

(10) Patent No.: US 10,902,328 B2
(45) Date of Patent: Jan. 26, 2021

(54) PROVISION OF RULES-BASED SYSTEM AS CLOUD SERVICE

(71) Applicant: SAP SE, Walldorf (DE)

(72) Inventors: Axel Schroeder, Dresden (DE); Christof Momm, Dresden (DE); Kay Jugel, Dresden (DE); Martin Knechtel, Dresden (DE)

(73) Assignee: SAP SE, Walldorf (DE)

( * ) Notice: Subject to any disclaimer, the term of this patent is extended or adjusted under 35 U.S.C. 154(b) by 789 days.

(21) Appl. No.: 15/402,526

(22) Filed: Jan. 10, 2017

(65) Prior Publication Data
US 2018/0197086 A1    Jul. 12, 2018

(51) Int. Cl.
G06N 5/02    (2006.01)
G06F 16/22   (2019.01)
G06N 5/04    (2006.01)

(52) U.S. Cl.
CPC ........... G06N 5/025 (2013.01); G06F 16/22 (2019.01); G06N 5/047 (2013.01)

(58) Field of Classification Search
CPC ......... G06F 16/22; G06N 5/025; G06N 5/047
See application file for complete search history.

(56) References Cited

U.S. PATENT DOCUMENTS 6,952,690 B2 * 10/2005 Lumpp .................. G06N 5/022
                                                          706/47

OTHER PUBLICATIONS

Carbin et al ("Detecting and Escaping Infinite Loops with Jolt", ECOOP'11 Proceedings of the 25th European conference on Object-oriented programming, Jul. 25-29, 2011, pp. 1-25) (Year: 2011).*
Zhang et al ("PREPARE: A Tool for Knowledge Base Verification", IEEE Transactions on Knowledge and Data Engineering, vol. 6, No. 6, Dec. 1994, pp. 983-989) (Year: 1994).*
Santos et al ("Verification and Validation of Power Systems Control Centres KBS", Procs. IASTED Artificial Intelligence and Applications (AIA2001), Sep. 2001, pp. 1-6) (Year: 2001).*
Zhang et al ("SREngine: An OSGi-based Context-aware Inference Engine for Smart Room", 2011 6th International Conference on Pervasive Computing and Applications, Port Elizabeth, 2011, pp. 267-271) (Year: 2011).*
Karna et al ("Anticrasher: Predicting and Preventing Impending Crashes on Runtime at User End", 2013 International Conference on Advances in Computing, Communications and Informatics (ICACCI), Mysore, 2013, pp. 448-453) (Year: 2013).*

\* cited by examiner

*Primary Examiner* — Kakali Chaki
*Assistant Examiner* — Robert Lewis Kulp
(74) *Attorney, Agent, or Firm* — Schwegman Lundberg & Woessner, P.A.

(57) ABSTRACT

An endless loop in an inference engine processing a set of rules according to facts stored in a database may be detected by: (a) analyzing the set of rules to identify a subset of the set of rules comprising rules that are triggered by an updated fact; (b) executing the rules of the subset; (c) updating at least one of the facts based on the execution of the rules; (d) storing an identifier for each executed rule of the subset; (e) associating each stored identifier with a subset number for the subset in a consecutive sequence of subset numbers for executed subsets; and repeating steps (a)-(e) until the identifier for a rule, to be executed, is associated with an excessive number of subset numbers that are equally offset from each other in the sequence of subset numbers for executed subsets.

20 Claims, 10 Drawing Sheets

PROVISION OF RULES-BASED SYSTEM AS CLOUD SERVICE

TECHNICAL FIELD

The present disclosure relates generally to data processing and, in particular embodiments, to detecting excessive loops and excessive data storage during the processing of a set of rules.

BACKGROUND

Production rule systems are computer applications that simulate a decision making process. A typical production rule system consists of an inference engine that applies logical rules to a knowledge base and deduces new knowledge with which to update the knowledge base. Such a production rule system includes a set of rules that are triggered by changes to a fact base, e.g., data items stored in a database. For example, an in-memory database (IMDB) that primarily relies on main memory (instead of disk storage) for computer data storage. One type of rule is composed of an "if" clause and a "then" clause. The "if" clause specifies the conditions (e.g., value of a fact in the database) under which a rule is executed or "fired," and the "then" clause specifies an action to be performed as an execution of the rule. Accordingly, each rule describes a state of the fact base (e.g., "if" clause of a rule to be fired) that requires a particular action (e.g., "then" clause of a rule to be fired). The "if" and corresponding "then" statements of a rule may be referred to as a "production."

One type of production rule system is a data driven, forward chaining rule-based system that applies the rules of the system to the data (e.g., fact base) in an integrated database, in response to an initial event (e.g., update of a fact) in the database, until a final determination is reached (e.g., no rules are triggered). This type of production rule system reacts to the initial event by searching the rules (of the set of rules) until it finds a rule that has a true "if" clause (e.g., "if" clause matches value of an updated fact). The production rule system then executes the "then" clause of the rule, updating the data in the database and/or causing other external or internal changes in the production rule system. The process is repeated after each update to a fact of the database, and the conditions of the rules are re-evaluated until none of the rules has a true "if" clause (e.g., no rules are triggered).

Typically, an inference engine executes triggered rules in an iterative manner. During a first iteration, the inference engine sequentially executes a subset (of the set of rules) that have each been triggered by an updated fact in the database. For each rule in the set of rules, the inference engine determines if the expression of the "if" clause is true with respect to the fact base in the database. If the expression is found to be true, the rule's corresponding "then" clause is executed. Often, the execution of the "then" clause includes making a change to a variable or parameter (e.g., fact) for a rule in the set of rules within the system. The inference engine notes such changed (e.g., updated) facts in the database. During a subsequent iteration, the inference engine determines which of the rules in the set of rules have an expression in an "if" clause that is dependent on one or more of the updated facts in the database. The inference engine then re-executes only those rules, and again updates the facts in the database. These iterations are repeated until no updated facts exist or no rule is triggered by an updated fact in the database.

Production rule systems may be susceptible to errors caused by unforeseen interactions between rules (e.g., interactions that cause the system to become stuck in an endless loop). This may occur, for example, when the expression of the 'if' clause of a first rule is dependent upon a fact that is changed by the statement of the "then" clause of a second rule, and the "if" clause of the second rule is dependent upon a fact that is changed by the statement of the "then" clause of the first rule. In this instance, the production rule system may become stuck in an endless loop.

Recently, the provision of computer services via the Internet (e.g., cloud service) has become popular and even production rule systems are being provided to the public as a cloud service. Despite most such cloud services including some limitations regarding the allowed types of rule facts and application programming interface (API) methods that can be called, these service do not otherwise restrict the use of an underlying production rule system. This freedom to use the underlying production rule system can cause problems in the context of a multi-tenant cloud based service that is supposed to be performance-isolated so that system users working within their quotas do not experience a performance impact based on other users exceeding their quotas.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
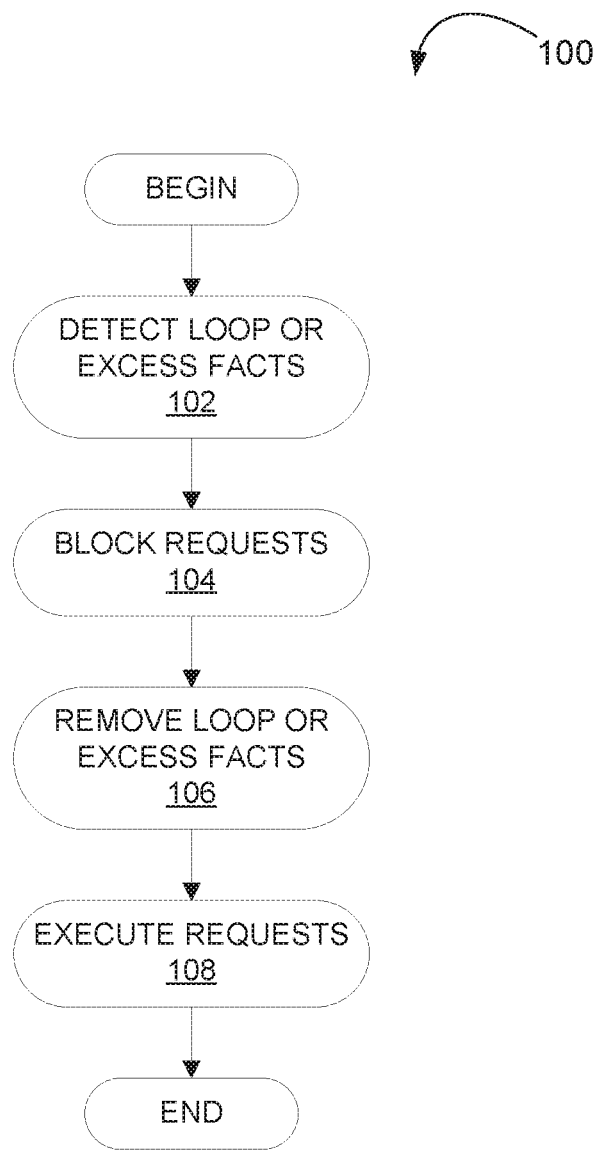
FIG. 1 is a is a high-level flow diagram illustrating a method, consistent with some embodiments, for detecting excessive loops and excessive data storage during the processing of a set of rules.

A conventional approach to providing a production rule system as a cloud service could lead to several concerns regarding providing the production rule system as a performance-isolated system. For example, if system users are able to define a set of rules producing endless loops (e.g., rule A triggers rule B and rule B triggers A again), then the underlying inference engine will intensively consume system resources, which will result in negative effects on the cloud service performance. Furthermore, customers can insert facts until the memory of the service is exceeded (e.g., via an endless loop that keeps inserting new facts), which can also effect the system's performance so that it may even become unresponsive. These two situations may have negative effects to other customers when the production rule system is provided as a multi-tenant cloud service; for example, one customer could potentially consume all available system memory and break the cloud service for other users. Consequently, a cloud service offering a production rule system as a service has to introduce appropriate measures to prevent endless loops and enforce fact limits for tenants.

Example Data Structures

In an example embodiment, a door is opened and closed, depending on room temperature and number of people in the room (e.g., based on a set of rules). The set of rules for such a production rule system may consist of two rules, which define that the door is to be opened when the room temperature is higher than 25° C. AND the door is currently closed, and the door is to be closed when the number of people in the room is 3 or less AND the door is currently open. It can be easily seen that this set of rules will not operate together properly when the temperature is over 25° C. and there are 3 or less people in the room.

Rule Set 1:
R1: If (temp>25° C.) AND (door=closed)
THEN door-open;
R2: If (number<=3) AND (door-open)
THEN door-closed Both of the actions of opening and closing the door (e.g., when each rule is fired) may be constantly activated by a looping program behavior. Although the possible loop in such a simple set of rules (as in the above example Rule Set 1) may easily be detected, a larger more complex set of rules may require a way to automatically identify a possible loop as described herein.

In an example embodiment, a fact is added to a database by a first rule that is fired based on an update to a fact, and a second rule that updates the fact is triggered by a new fact in the database. The set of rules for such a production rule system may consist of two rules:

Rule Set 2:
R3: IF (fact=updated)
THEN new fact=added:
R4: IF (new fact=added)
THEN fact=updated Both of the actions of updating a fact in the database and adding a new fact to the database may be constantly activated by a looping program behavior that continues to insert new facts into the database. Although the possible loop and fact insertion in such a simple set of rules (as in the above example Rule Set 2) may easily be detected, a larger more complex set of rules may require a way to automatically identify these issues.

Example Processing Overview

FIG. 1 is a high-level flow diagram illustrating a method 100, consistent with some embodiments, for detecting excessive loops and excessive data storage during the processing of a set of rules.

Production rule systems may offer support for so-called "point-in-time" rules, which are fired immediately after they are triggered, and "scheduled" rules, where triggering and firing are decoupled events. A scheduled rule that is triggered is only fired after a scheduled time period has elapsed since the rule was triggered. Therefore, a combined approach is described herein for detecting endless loops and enforcing fact limits (e.g., for a user) when a production rule system, that is offered as a cloud service, is processing a rule set that includes both scheduled rules and point-in-time rules.

In order to address the above-noted concerns, the provision of a production rule system as a cloud service is described herein with respect to method 100 which includes four phases: Detect, Block, Correct and Recover.

At operation 102 (e.g., Phase 1—Detect): a detection mechanism is active for each rule execution and uses heuristics to detect loops while in parallel checking for fact limits that may be exceeded.

At operation 104 (e.g., Phase 2—Block): based on an issue being detected at operation 102 (e.g., a loop) the inference engine is set to a state (e.g., blocked) where each new request to execute a rule is blocked and an error message is sent to a client device, e.g., with a hint to regarding the issue which led to the blocking. In this way, the calling client can store these error messages regarding failed rule execution requests and again request execution of these rules as soon as the issue is corrected during the following correction phase.

At operation 106 (e.g., Phase 3—Correct): for correcting the detected issues, a designer of the affected rules (e.g., having received the above-noted error message) either performs a fact cleanup (e.g., fact removal) or removes/corrects the rules leading to the detected loop. Once this is done the inference engine may be recovered (e.g., remove block of inference engine).

At operation 108 (e.g., Phase 4—Recover): the rule designer may apply the corrected rule set and/or cleanup the excess facts in order to recover the inference engine from the blocked state. If the issues are truly resolved the engine will work as usual again (e.g., executing requests). The method 100 then starts over again since the detection mechanism is active for each rule execution. If the issues have not been resolved, the inference engine will transition back to the blocked phase (e.g., operation 104) again upon re-detection of the unresolved issue (e.g., at operation 102).

Example System Architecture

Figure 2:
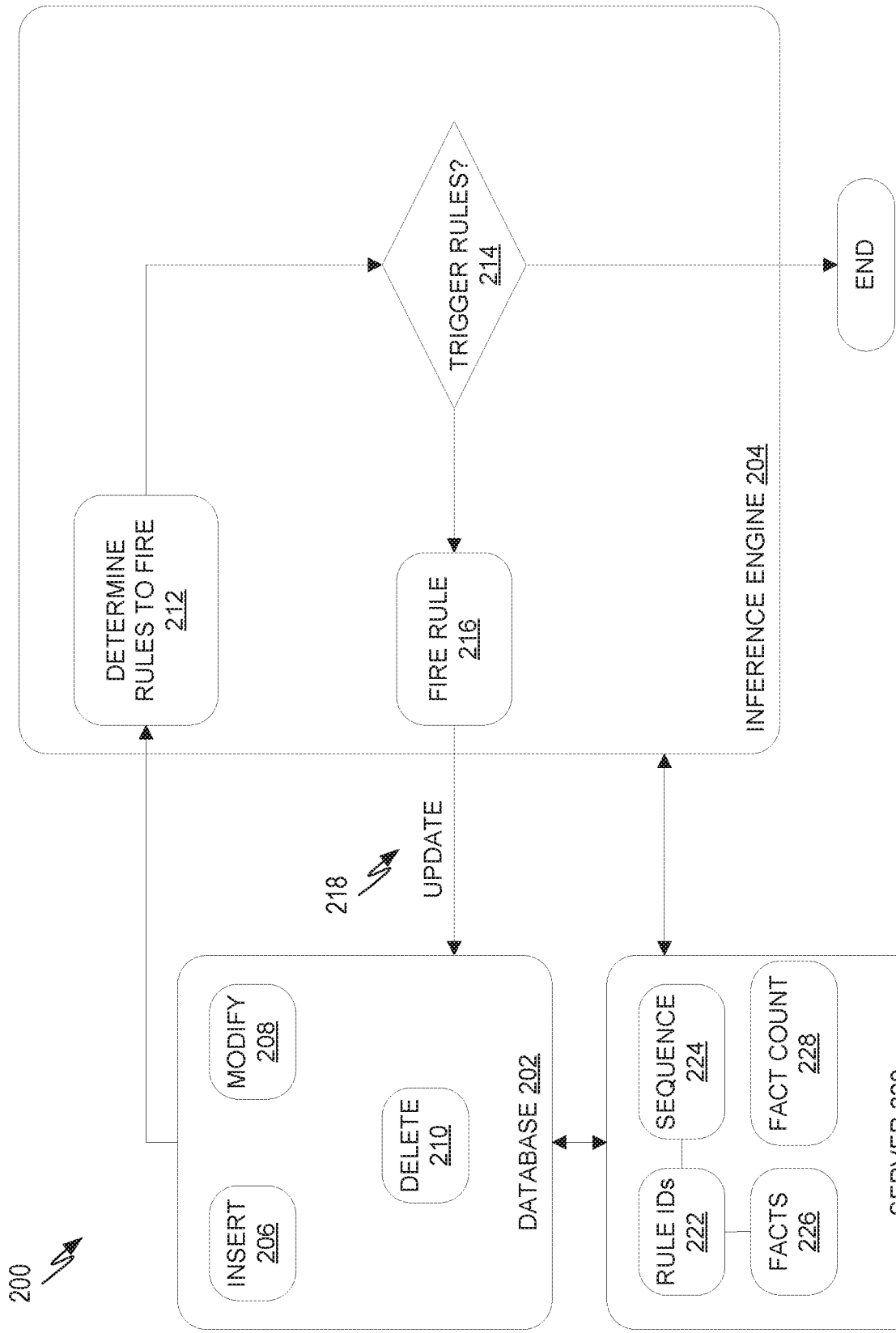
FIG. 2 is a block diagram of a data flow of a system, consistent with some embodiments, configured to detect excessive loops and excessive data storage during the processing of a set of rules.

FIG. 2 is a block diagram of a data flow of a system 200, consistent with some embodiments, configured to detect excessive loops and excessive data storage during the processing of a set of rules.

Production rule system 200 uses inference engine 204 to process a set of rules based on a set of facts stored in database 202 (e.g., an IMDB) using the following flow initialized by an update of a fact in the database 202. The update of a fact in database 202 may include an insert 206, modify 208 and/or delete 210 of the fact. The inference engine 204, of system 200, may then determine 212 which rules to fire (e.g., by checking the applicable "if" clauses in view of the modification) from the set of rules. The inference engine 204, of system 200, may then trigger 214 eligible rules (e.g., with "if" clauses satisfied by the modification), resulting in a first subset of the set of rules that are to be executed (e.g., fired). This first subset may be referred to as a rules agenda. The inference engine 204, of system 200, may then fire 216 the rules in the first subset (e.g., inference engine 204 iterates over a list of rules in the first subset), by executing the corresponding "then" clauses of the rules in the first subset. In the example of FIG. 2, the firing 216 of the rules in the first subset may include an update 218 of a fact in database 202. The update 218 to the fact may trigger 214 further rules, which are then added to a second subset of the set of rules that are to be fired 216 in a second iteration by the inference engine 204.

The inference engine 204 continues the above-noted process (e.g., data flow) until no updated facts exist (e.g., the firing 216 of the rules in a subset does not include an update 218 of a fact in database 202) or no rule is triggered 214 by an updated fact in the database 202.

The system 200 also includes a server 220 (e.g., a server providing access to the production rule system 200 as a cloud service) for storing and/or processing metadata associated with the processing of the rules by production rule system 200. In an embodiment, the metadata may be stored in database 202. The metadata processed by server 220 may be used to detect an endless loop (or an exceeded fact limit) in production rule system 200.

In this regard, the server 220 may store an identifier (ID) for each executed rule of the first subset, e.g., rule IDs 222 and associate each stored rule ID 222 with a subset number for the first subset (e.g., number 1) in a consecutive sequence 224 of subset numbers for executed subsets. Thereafter, the inference engine 204 may continue the above-described data flow until: no subset of the set of rules is triggered 214 by an updated 218 fact of the facts; or the rule ID 222 for a rule, to be fired 216, is associated with a number of subset numbers that are offset from each other in the sequence 224 by a same offset value (e.g., 1, 5, 9 and 13: all separated by an offset value=3) and the number exceeds a loop threshold value (e.g., 100). The loop threshold value may be determined based on the available processing capacity and storage capacity (e.g., database 202) available to production rule system 200. For example, the offset value is equal to one when two rules trigger each other. In this situation, the rule ID 222 for each of these rules will appear in a number of alternating subsets (e.g., offset value=1) of the sequence 224 (e.g., 1, 3, 5, 7, etc.) and if the number is greater than the loop threshold value then the inference engine 204 will be blocked from executing any further rules (e.g., by server 220). However, if rule A triggers rule B, rule B triggers rule C and rule C triggers rule A, then the offset value between each subset number in the sequence 224 that is associated with a same one (e.g., A) of the rule IDs 222 is equal to two (e.g., 1, 4, 7, 10, etc.), and so on.

The server 220 may also store, with each rule ID 222, a fact 226 that satisfies the expression of the "if" statement of the rule identified by the rule ID 222 and associate each stored rule ID 222 and fact 226 with the subset number for the first subset in the sequence 224 of subset numbers for executed subsets. Thereafter, the inference engine 204 may continue the above-described data flow until: no subset of the set of rules is triggered 214 by an updated 218 fact of the facts; or the rule ID 222 for a rule, to be fired 216, is associated with a number of subset numbers that are offset from each other in the sequence 224 by a same offset value and the number exceeds a loop threshold value; and the expression of the "if" statement of the rule is satisfied based on a same fact that is stored together with the rule ID 222 for the rule in association with a subset number in the sequence 224.

The server 220 may also store a fact count 228, which keeps track of the number of facts added to database 202 by a single user, e.g., one of the multiple tenants using the multi-tenant production rule system 200. Therefore, based on the firing 216 of a rule updating 218 at least one of the facts, the inference engine 204 may continue the above-described data flow until a number of the facts in database 202 or an amount of memory of the database 202 storing the facts exceeds a fact threshold value. The fact threshold value may be selected based on a storage capacity of database 202 that is provided to a single user of production rule system 200.

Example Methods

Figure 3:
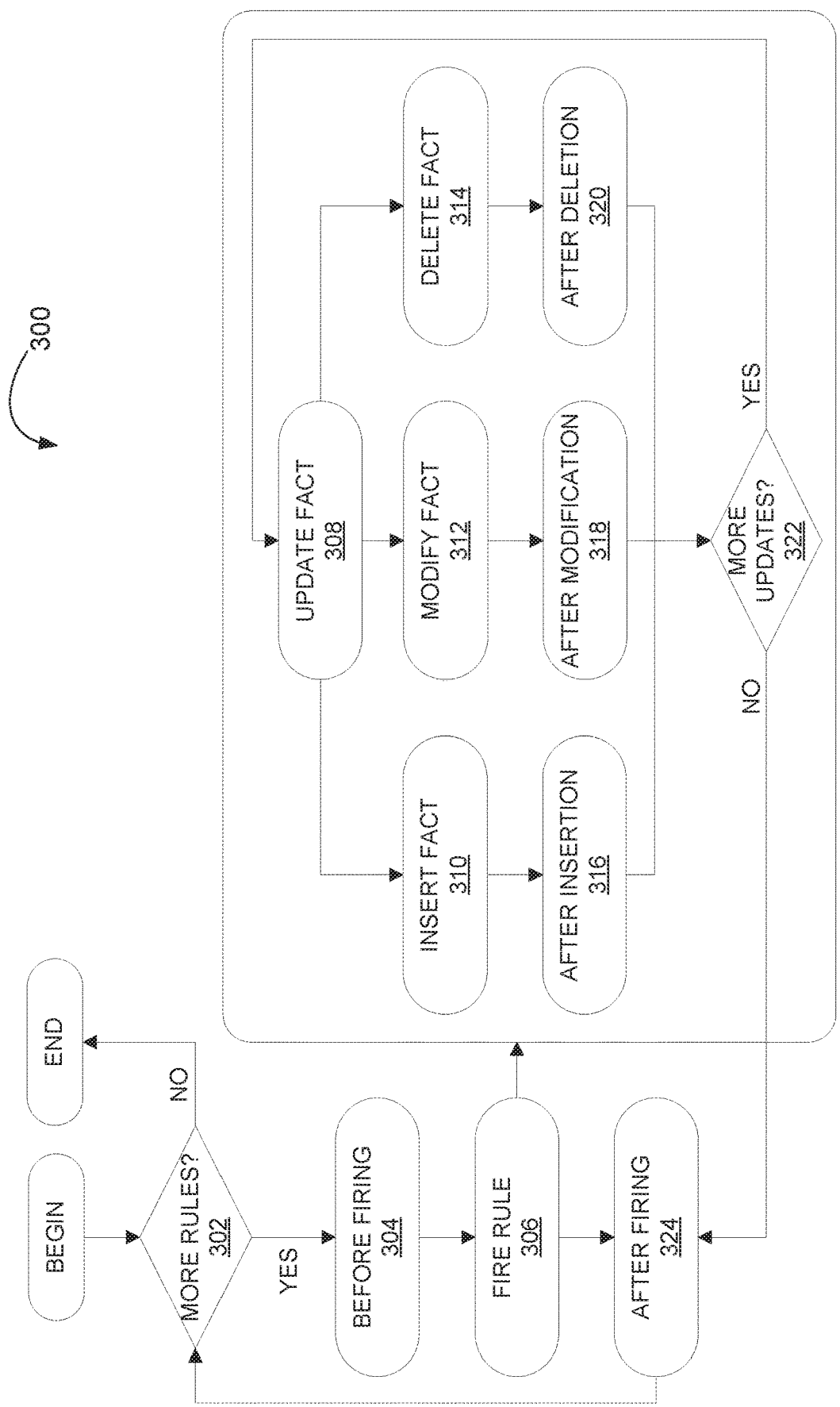
FIG. 3 is a flow diagram illustrating a method, consistent with some embodiments, for detecting excessive loops and excessive data storage during the processing of a set of rules.

FIG. 3 is a flow diagram illustrating a method 300, for detecting excessive loops and excessive data storage during the processing of a set of rules. The following description of FIG. 3 refers to elements from FIG. 2, which elements are referred to using the same identifiers.

The method 300 may detect an endless loop (or an exceeded fact limit) in an inference engine 204 processing a set of rules according to facts stored in a database 202. The method 300 is based on hooks available for "listening" to the processing of the rules by production system 200. For example, in order to detect loops, additional process execution logic is provided before a single rule is fired 216 and after it has been fired 216 in the data flow of FIG. 2. Most production rule systems (e.g., system 200) offer the option of registering an event listener for events (e.g., fire rule 216) at specified "hooks" during the processing of the rules. The rule execution of production rule system 200 happens in a single thread and therefore it is possible to correlate information (e.g., metadata stored/processed by server 220) from different "fire rule 216" executions across a complete agenda evaluation (e.g., execution of sequence of triggered subsets of the set of rules).

During the "fire rule 216" executions the facts stored in database 202 can be updated 218 (e.g., insert 206/modify 208/delete 210). In an embodiment, in order to enforce fact limits (e.g., quotas), production rule system 200 provides hooks for these events (e.g., update 218) as well. The fact limit enforcement mechanism described herein may include additional process execution logic after a rule is updated 218 by an insert 206 and/or a delete 210.

Finally, some minor extensions may be provided for cleanup of variables used for loop detection. This is because fire rule 216 covers the execution of all available rules (and the subsequently triggered rules) for point-in-time rules, while a scheduled rule execution is limited to the single scheduled rule (and the subsequently triggered rules).

At operation 302, the inference engine 204 analyzes the set of rules, to identify a subset of the set of rules, with the subset comprising rules that are triggered by an updated fact of the facts. At operation 304, extra process execution logic is provided (as described more fully below) before any rules are fired. For example, the server 220 may check whether any subset of the set of rules is triggered by an updated fact of the facts, or whether the rule ID 222 for a rule, to be fired 306, is associated with a number of subset numbers that are offset from each other in the sequence 224 by a same offset value and the number exceeds a loop threshold value, before allowing the inference engine 204 to fire the rule of the subset at operation 306. Other examples of extra process execution logic that may be added at operation 304 are described below.

At operation 308, the inference engine 204 updates at least one of the facts based on the firing of the rule at operation 306. At operations 310, 312 and 314, the update 308 to the at least one fact may include an insertion (310), modification (312) and/or deletion (314) of a fact respectively. At operations 316, 318 and 320, extra process execution logic is provided (as described more fully below) after any facts are inserted 310, modified 312 and/or deleted 314 respectively. For example, the server 220 may check whether a number of the facts in database 202 or an amount of memory of the database 202 storing the facts exceeds a fact threshold value at operation 316 after a fact has been inserted. Other examples of extra process execution logic that may be added at operations 316, 318 and/or 320 are described below.

At operation 322, it is determined whether any more updates 308 are specified by the current fire rule 306. If more updates are specified then the method 300 proceeds to operation 308 and continues the process execution. If more updates are not specified then the method 300 proceeds to "after firing" operation 324 where extra process execution logic may be added for after a fire rule 306 is executed. As noted above, minor extensions (cleanup of variables used for loop detection) may be used if a scheduled rule has been triggered.

In regard to the extra process execution logic added at operation 304, the basic idea is to memorize (e.g., by server 220) rules that have already been executed in a ThreadLocal map (e.g., sequence 224 and associated data) stored in Thread-local storage (TLS), which is a computer programming method that uses static or global memory local to a thread. Rules have unique rule IDs 222. If a rule is executed more than once within one execution sequence 224 (e.g., iterative execution of triggered subsets of rules until process terminates), then the sequence 224 will include several subsets with the same associated rule IDs 222. Consequently, if a rule ID 222 that is already associated with a subset of the sequence 224 is to be fired 304, this may be a strong indicator that a loop has been detected. However, if a rule has multiple "if" clauses (e.g. multiple fact queries), this may also result in multiple triggering of the same rule. Therefore, the extra process execution logic added at operation 304 may enforce a limit (e.g. threshold value) of x (e.g., default=100) "offset" (e.g., repeating over fixedly offset subset numbers of sequence 224) executions of a single rule. Only after this threshold value has been reached, will the server 220 determine that a loop has been detected.

In regard to the extra process execution logic added at operation 324 "after firing", the basic idea is that if process threads (e.g., for rule executions) are not reused then extra process execution logic at 324 may perform garbage collection by cleaning up the thread local variables after all rule executions. Therefore, for point in time rules the cleanup is done at operation 324 after all rules have been fired at operation 306 and the rule processing has terminated. If process threads are reused (e.g., using a web container), then a reset of any counters (e.g., subset numbers in sequence 224) may be required to avoid an infinitely growing sequence 224 and false positives for loop detection due to wrong start values for sequence 224. Therefore, for scheduled rules the cleanup is done at operation 304 in the "before firing" action so that the sequence 224 does not include previously executed subsets when the scheduled rule is executed at operation 306.

In an embodiment (explained more fully below), it is possible to also evaluate the fact update 308 that led to the activation. The server 220 will determine that a loop has been detected only if the same updated fact has triggered the rule.

In regard to the extra process execution logic added at operation 316, the basic idea is that if new fact are inserted at operation 310, then the extra process execution logic added at operation 316 checks if a fact limit (e.g., fact threshold value) is exceeded. The limit can either be expressed in terms of a maximum fact count or in terms of a memory limit (e.g., 100 GBs) of database 202. The use of a memory limit may require a calculation (or at least a good estimation) of the average memory consumption of a fact. The current fact count can retrieved (e.g., by server 220), from the inference engine's working memory (e.g., database 202). If the fact limit is exceeded, then the inference engine 204 is set to blocked state (e.g., by server 220) and a corresponding warning is provided to a relevant user of production rule system 200.

In an embodiment, in order to allow for a timely intervention by a relevant user of production rule system 200, a warning may be provided to the user if a certain percentage (e.g., default=60%) of the fact limit is reached. In an embodiment, in order to avoid spamming the user (e.g., rule designer) with fact limit warnings, a minimum percentage threshold is defined (e.g., default=2%) so that a new warning is created only if the quota increases by at least the minimum percentage threshold.

In regard to the extra process execution logic added at operation 320, the basic idea is that if a fact is deleted at operation 314, then the extra process execution logic added at operation 320 checks if a fact limit (e.g., fact threshold value) is exceeded. If a fact count that was over the fact limit is now within the fact limit based on the fact deletion at operation 314, the inference engine 204 will be set to available again.

Figure 4:
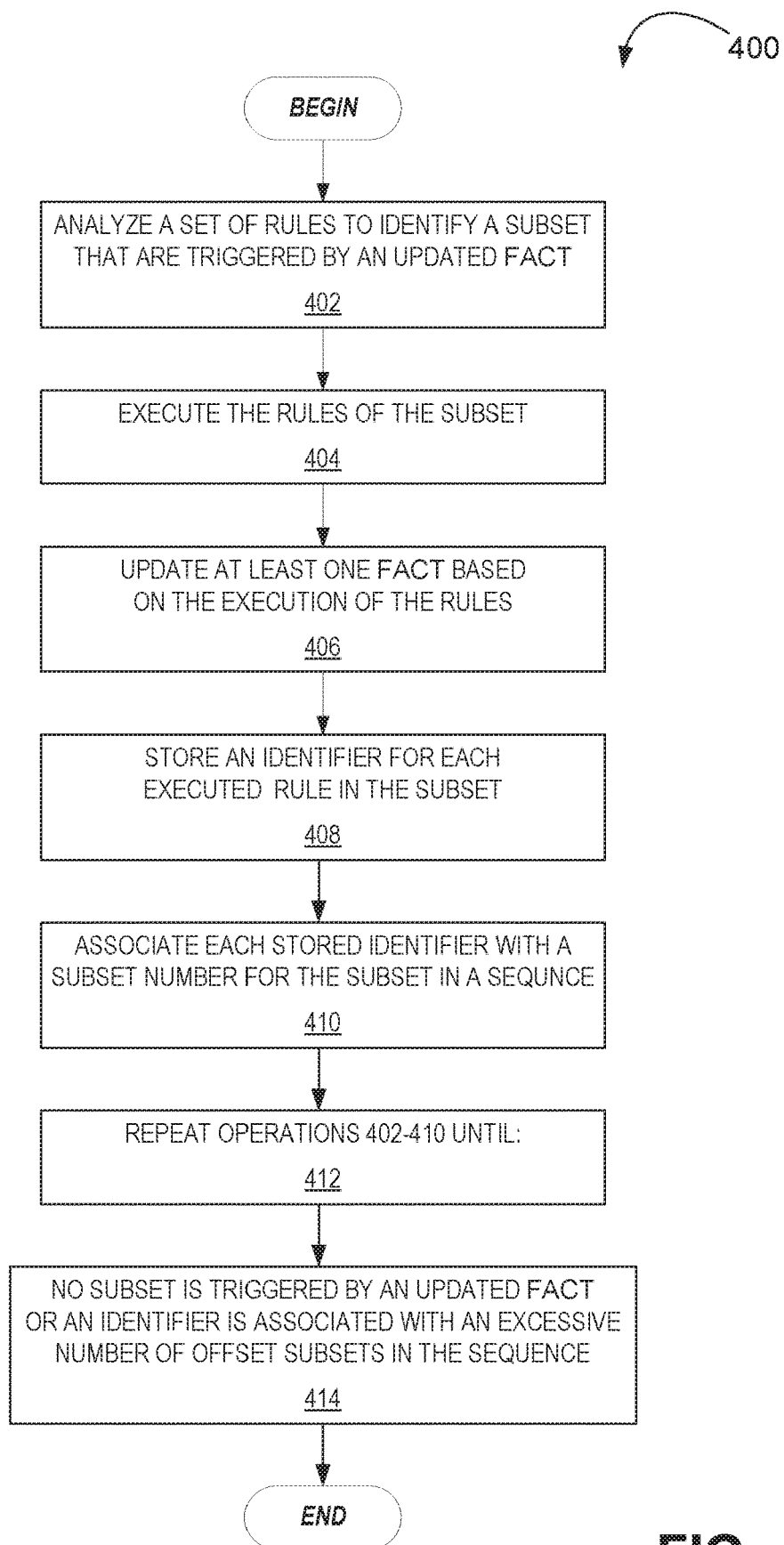
FIG. 4 is a flow diagram illustrating a method, consistent with some embodiments, for detecting an endless loop during the processing of a set of rules.

FIG. 4 is a flow diagram illustrating a method 400, consistent with some embodiments, for detecting an endless loop in an inference engine processing a set of rules according to facts stored in a database. The following description of FIG. 4 refers to elements from FIG. 2 and FIG. 3, which elements are referred to using the same identifiers.

At operation 402, in a step (a) the set of rules is analyzed, using the inference engine 204, to identify a subset of the set of rules, with the subset comprising rules that are triggered by an updated fact of the facts stored in database 202. As noted above, the analysis may comprise examining the "if" clauses of the rules to determine if they match the updated fact in database 202.

At operation 404, in a step (b) the rules of the subset are executed using the inference engine 204. As noted above, the analysis may comprise performing actions specified in the "then" clauses of the rules with "if" clauses that do match the updated fact.

At operation 406, in a step (c) at least one of the facts is updated (e.g., update 308), using the inference engine 204, based on the execution of the rules of the subset. As noted above, the updating of a fact may include inserting 310, modifying 312 or deleting 314 the fact in database 202.

At operation 408, in a step (d) an identifier (e.g., rule ID 222) for each executed rule of the subset is stored (e.g., by server 220).

At operation 410, in a step (e) each stored identifier (e.g., rule ID 222) is associated, by server 220, with a subset number for the subset in a consecutive sequence 224 of subset numbers for executed subsets. As noted above, each iteration over the rules by inference engine 204 identifies a subset of the rules that is triggered by an update to the facts in database 202. Each such identified subset is assigned a next consecutive number, which is added to the sequence 224. In this way, a subset number in the sequence may be examined to determine the rule IDs 222 that are associated with the subset number in order to determine which rules have been fired at each point in the sequence 224 of executed subsets.

At operation 412, the method 400 repeats operations 402-410 (e.g., steps (a)-(e)) until a specified determination is made at operation 414. As noted above, extra process execution logic may be added at specified "hooks" during the processing of rules and these extra portions of code may provide the logic for the determination (e.g., a loop is detected) at operation 414.

At operation 414, the server 220 determines whether the rule ID 222 for a rule, to be executed (e.g., fire rule 306), is associated with a number of subset numbers that are offset from each other in the sequence 224 by a same offset value and the number exceeds a loop threshold value (e.g., 200).

The inference engine 204 may be put into a block phase (e.g., by server 220) based on a detected loop or an exceeded fact limit as explained more fully below. In either case, the inference engine 204 rejects incoming new events (e.g., request for rule execution) with an Hypertext Transfer Protocol (HTTP) 500 error and creates a rule warning. The error messages for both the endless loop and the excess facts include the root cause for the rejected requests and hints on how to solve the issue (e.g., check for loops in affected rules). In case of a loop, the message includes the rules that led to the detected loop and a full trace of the detection mechanism (last x rule executions leading to the loop detection). In most cases, the rule "then" clauses may be changed to address these issues.

In a final correction phase, corrected rules and/or newly introduced clean-up rules (e.g., to delete excess facts) are deployed on the production rule system 200. During this rule deployment procedure, the old fact base (e.g., facts in database 202 when inference engine 204 was blocked) is fully restored (including scheduled activations) and all rules are fired. The "block" is removed from the inference engine 204 so that it may return to functioning (e.g., processing rules) in the "detect phase".

Figure 5A:
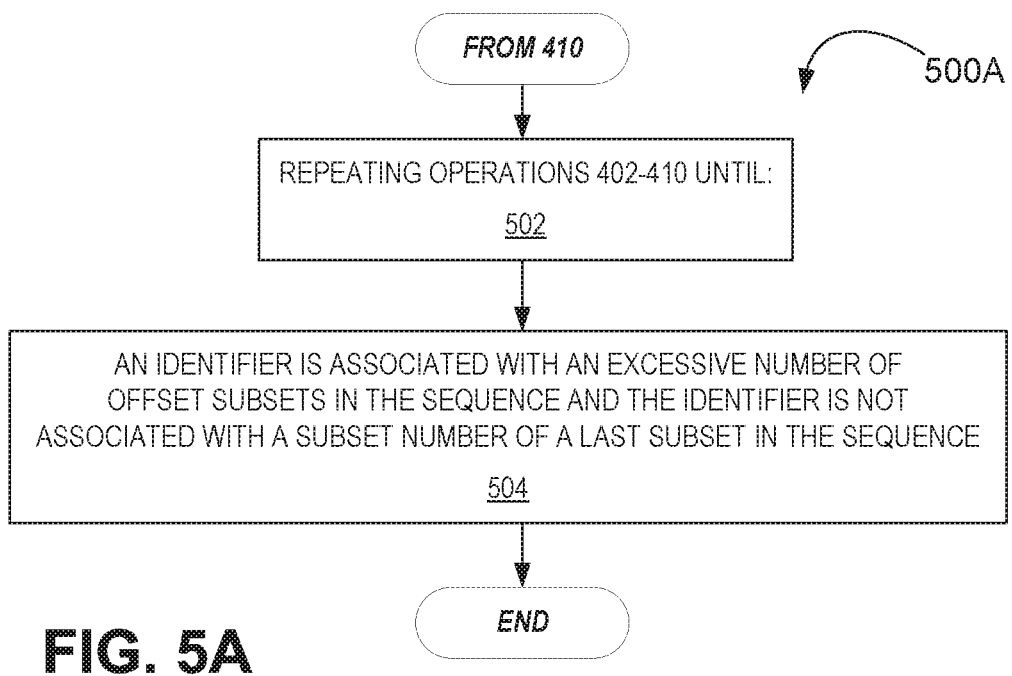
FIG. 5A is a flow diagram further illustrating a method, consistent with some embodiments, for detecting an endless loop during the processing of a set of rules.

FIG. 5A is a flow diagram further illustrating a method 500A, consistent with some embodiments, for detecting an endless loop during the processing of a set of rules. The following description of FIG. 5A refers to elements from FIG. 2, FIG. 3 and FIG. 4, which elements are referred to using the same identifiers.

At operation 502, which continues from operation 410 of FIG. 4, the method 500A repeats operations 402-410 of FIG. 4 (e.g., steps (a)-(e)) until a specified determination is made at operation 504. As noted above, extra process execution logic may be added at specified "hooks" during the processing of rules and these extra portions of code may provide the logic for the determination (e.g., a loop is detected) at operation 504.

At operation 504, the server 220 determines whether: the rule ID 222 for a rule, to be executed (e.g., fire rule 306), is associated with a number of subset numbers that are offset from each other in the sequence 224 by a same offset value and the number exceeds a loop threshold value (e.g., 150); and the rule ID 222 for the rule is not associated with a subset number of a last subset in the sequence. In this way, it may be determined whether a rule is only being executed in fixedly offset subsets or whether it is being executed in consecutive subsets. If the rule to be executed has also been executed in the previously executed subset (e.g., it is associated with the last subset number in the sequence 224) then it is being executed consecutively.

Figure 5B:
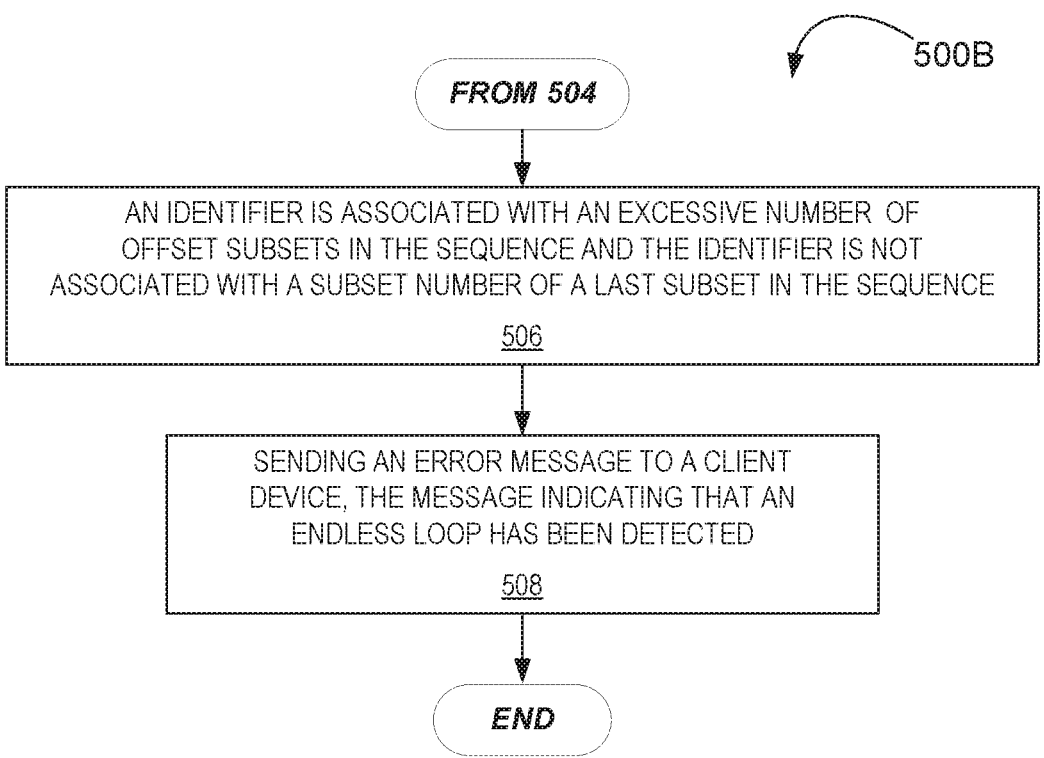
FIG. 5B is a flow diagram illustrating a method, consistent with some embodiments, for sending an error message when an endless loop is detected during the processing of a set of rules.

FIG. 5B is a flow diagram illustrating a method 500B, consistent with some embodiments, for sending an error message when an endless loop is detected during the processing of a set of rules. The following description of FIG. 5B refers to elements from FIG. 2, FIG. 3 and FIG. 4, which elements are referred to using the same identifiers.

At operation 506, which continues from operation 504 of FIG. 5A, the server 220 determines that the rule ID 222 for a rule, to be executed (e.g., fire rule 306), is associated with a number of subset numbers that are offset from each other in the sequence 224 by a same offset value and the number exceeds a loop threshold value (e.g., 150); and the rule ID 222 for the rule is not associated with a subset number of a last subset in the sequence.

At operation 508, the server 220 sends an error message to a client device of the production rule system 200, the error message indicating that an endless loop has been detected and providing relevant data (e.g., rule IDs 222) for the rules that are being triggered by each other in an endless loop.

Figure 6A:
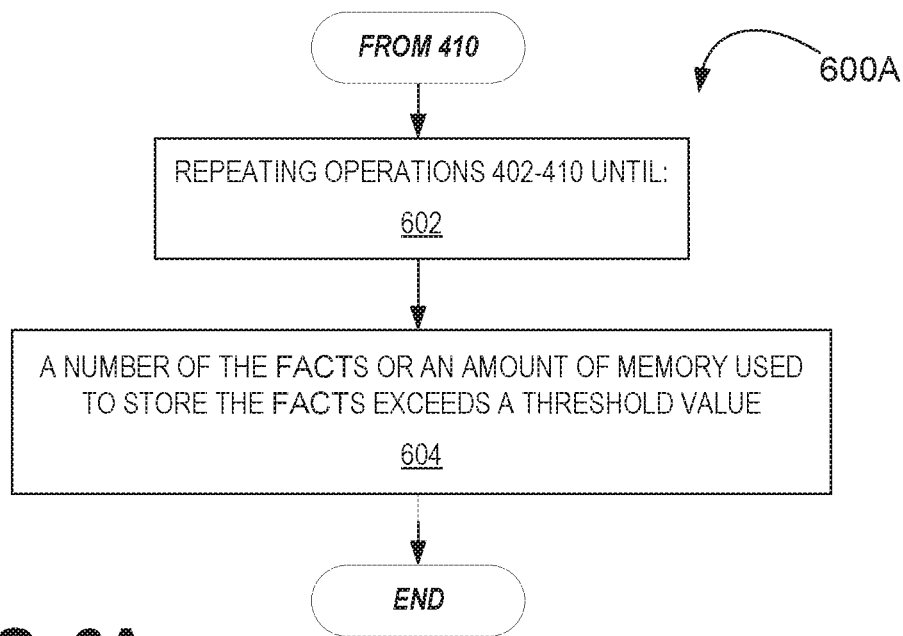
FIG. 6A is a flow diagram further illustrating a method, consistent with some embodiments, for an excessive amount of facts stored during the processing of a set of rules.

FIG. 6A is a flow diagram further illustrating a method 600A, consistent with some embodiments, for detecting for an excessive amount of facts stored during the processing of a set of rules. The following description of FIG. 6A refers to elements from FIG. 2, FIG. 3 and FIG. 4, which elements are referred to using the same identifiers.

At operation 602, which continues from operation 410 of FIG. 4, the method 600A repeats operations 402-410 of FIG. 4 (e.g., steps (a)-(e)) until a specified determination is made at operation 604. As noted above, extra process execution logic may be added at specified "hooks" during the processing of rules and these extra portions of code may provide the logic for the determination (e.g., a loop is detected) at operation 604.

At operation 604, the server 220 determines whether: a number of the facts or an amount of memory of the database 202 storing the facts exceeds a fact threshold value. In this way, it may be determined if a user of the production rule system 200 has exceeded a fact limit (e.g., fact threshold value) assigned to each tenant of a multi-tenant production rule system 200. Using more memory than has been allotted to the user can affect the performance of a multi-tenant production rule system 200 with respect to all users, not just the user that has exceeded their assigned fact limit.

Figure 6B:
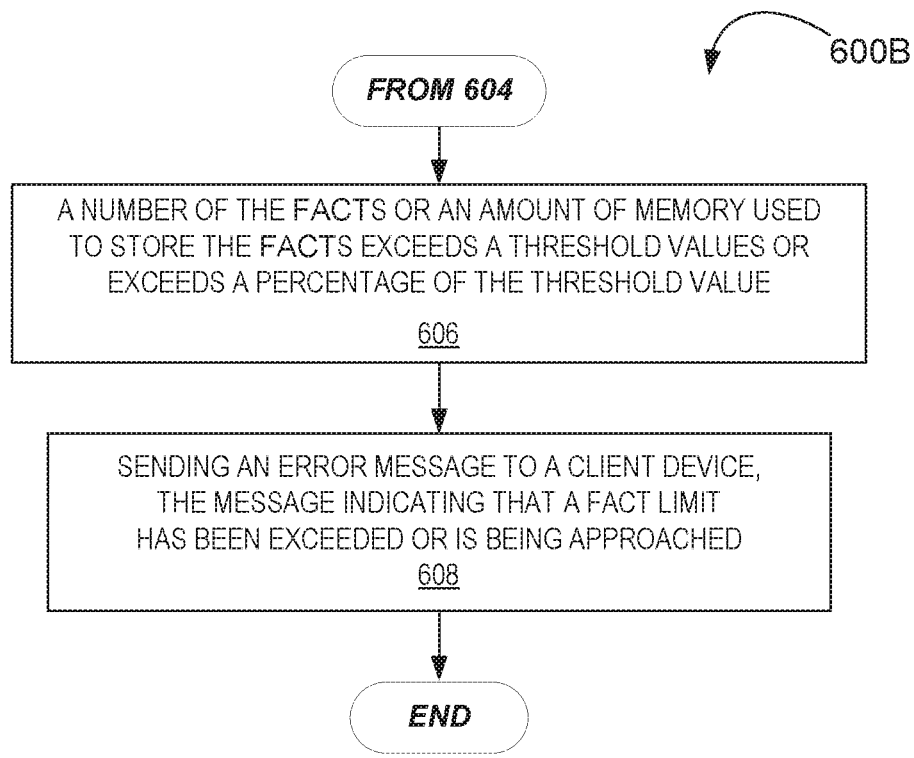
FIG. 6B is a flow diagram illustrating a method, consistent with some embodiments, for sending an error message when an excessive amount of facts is stored during the processing of a set of rules.

FIG. 6B is a flow diagram illustrating a method 600B, consistent with some embodiments, for sending an error message when an excessive amount of facts is stored during the processing of a set of rules. The following description of FIG. 6B refers to elements from FIG. 2, FIG. 3 and FIG. 4, which elements are referred to using the same identifiers.

At operation 606, which continues from operation 604 of FIG. 6A, the server 220 determines that a number of the facts or an amount of memory of the database 202 storing the facts does exceed the fact threshold value (e.g., fact limit) or a specified percentage of the fact threshold value.

At operation 608, the server 220 sends an error message to a client device of the production rule system 200, with the error message indicating that a fact limit has been exceeded (or is being approached) and providing relevant data (e.g., data regarding facts that were added to database 202 in excess of the threshold value or the percentage of the threshold value).

Figure 7:
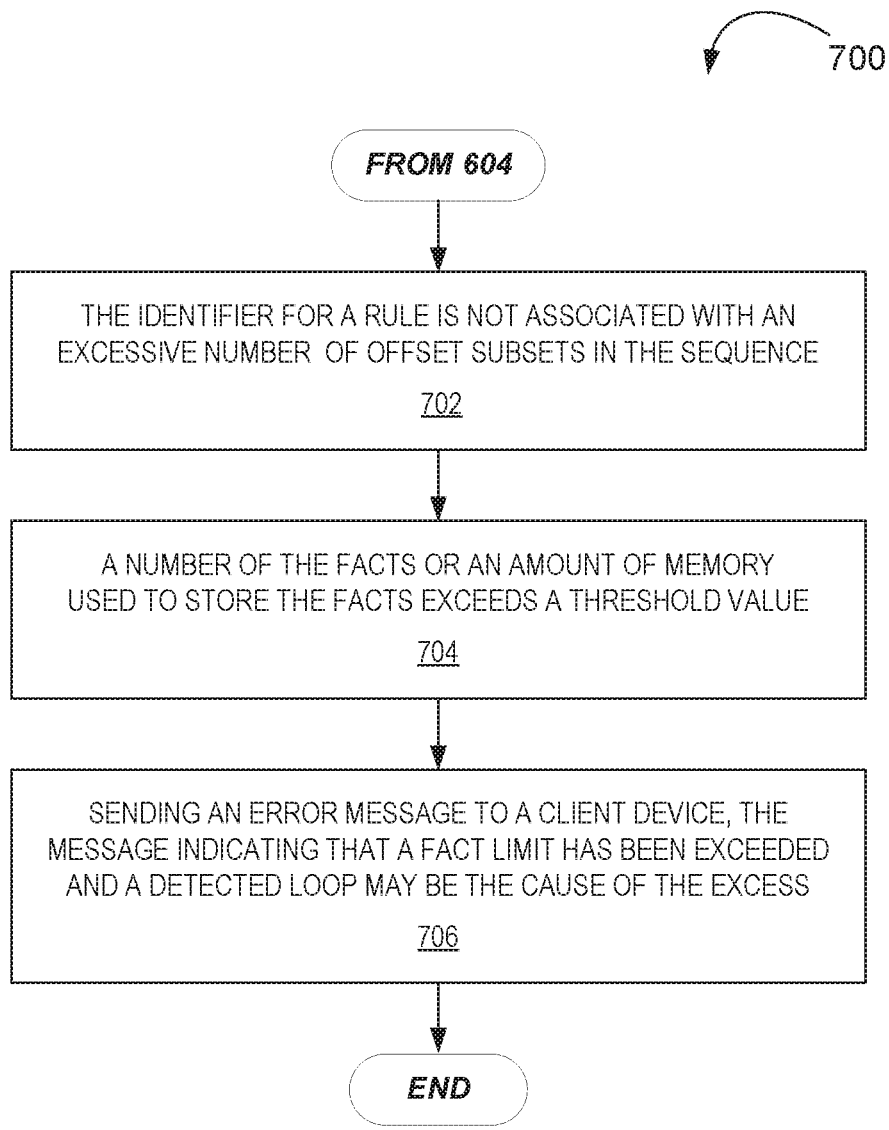
FIG. 7 is a flow diagram illustrating a method, consistent with some embodiments, for detecting a loop and an excessive amount of facts stored during the processing of a set of rules and sending an error message.

FIG. 7 is a flow diagram illustrating a method 700, consistent with some embodiments, for detecting a loop and an excessive amount of facts stored during the processing of a set of rules and sending an error message. The following description of FIG. 7 refers to elements from FIG. 2, FIG. 3, FIG. 4 and FIG. 6, which elements are referred with the same identifiers.

At operation 702, which continues from operation 604 of FIG. 6A, the server 220 determines that the rule ID 222 for a rule, to be executed (e.g., fire rule 306), is associated with a number of subset numbers that are offset from each other in the sequence 224 by a same offset value and the number exceeds a loop threshold value.

At operation 704, the server 220 determines that a number of the facts or an amount of memory of the database 202 storing the facts does exceed the fact threshold value (e.g., fact limit).

At operation 706, the server 220 sends an error message to a client device of the production rule system 200, with the error message indicating that a fact limit has been exceeded and a detected loop (which has not yet been determined to be endless) may be a cause of the exceedance. The error message may provide relevant data (e.g., data regarding facts that were added to database 202 in excess of the threshold value and rule IDs 222 for rules that may be causing the excess facts because they are in a loop).

Therefore, if there is a significant number (e.g., a specified value) of fixedly offset rule executions (even though they are still below the loop threshold value), the detected loop may be the cause for the fact threshold being exceeded and consequently the loop warnings are added to the original fact limit error message.

Figure 8:
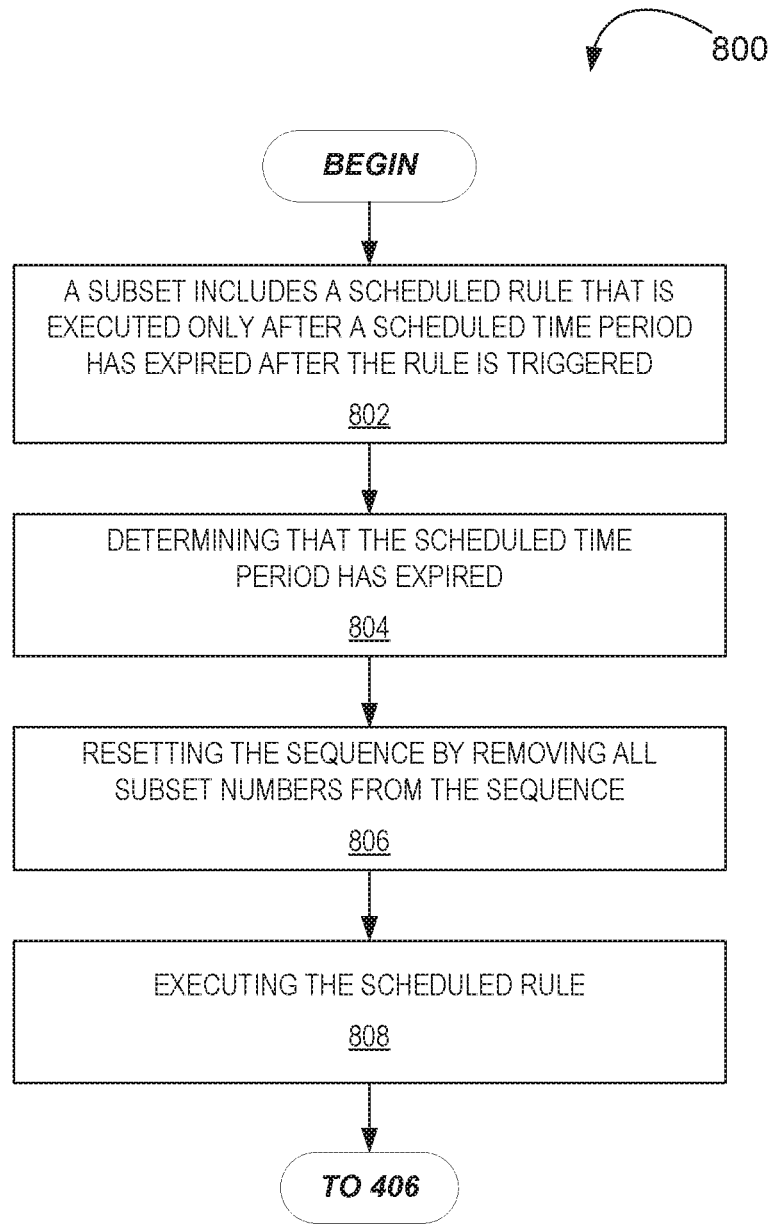
FIG. 8 is a flow diagram illustrating a method, consistent with some embodiments, for detecting an endless loop and/or an excessive amount of facts stored during the processing of a scheduled rule.

FIG. 8 is a flow diagram illustrating a method 800, consistent with some embodiments, for detecting an endless loop and/or an excessive amount of facts stored during the processing of a scheduled rule. The following description of FIG. 8 refers to elements from FIG. 2, FIG. 3 and FIG. 4, which elements are referred with the same identifiers At operation 802, the inference engine 204 determines that a subset to be executed (e.g., fire rule 306) includes a scheduled rule that is executed based on a scheduled time period elapsing after the rule is triggered.

At operation 804, the inference engine 204 may determine that the scheduled time period has elapsed since the scheduled rule was triggered.

At operation 806, all subset numbers are removed from the sequence 224 (e.g., by server 220) before executing the scheduled rule using the inference engine 204. As noted above, this "garbage collection" step allows the scheduled rule to be executed without having to consider subsets of the rules that were executed during a previous round of point-in-time rule executions.

At operation 808, the inference engine 204 proceeds to execute the scheduled rule with a brand new (e.g. empty) sequence of executed subsets. The method 800 then proceeds to operation 406 of FIG. 4.

EXAMPLES

Example 1

A system comprising: a hardware processor; an inference engine configured to process a set of rules; a database storing facts; and a memory including instructions which, when executed by the processor, cause the system to perform operations comprising: (a) analyzing the set of rules, using the inference engine, to identify a subset of the set of rules, the subset comprising rules that are triggered by an updated fact of the facts; (b) executing the rules of the subset using the inference engine; (c) updating, using the inference engine, at least one of the facts based on the execution of the rules of the subset; (d) storing, using the processor, an identifier for each executed rule of the subset; (e) associating, using the processor, each stored identifier with a subset number for the subset in a consecutive sequence of subset numbers for executed subsets; and repeating steps (a)-(e) until the identifier for a rule, to be executed, is associated with a number of subset numbers that are offset from each other in the sequence by a same offset value and the number exceeds a loop threshold value.

Example 2 the system of example 1, the operations further comprising: repeating steps (a)-(e) until: the identifier for a rule, to be executed, is associated with a number of subset numbers that are offset from each other in the sequence by a same offset value and the number exceeds the loop threshold value; and the identifier for the rule is not associated with a subset number of a last subset in the sequence.

Example 3 the system of example 2, wherein the identifier for a rule, to be executed, is associated with a number of subset numbers that are offset from each other in the sequence by a same offset value and the number exceeds the loop threshold value; the identifier for the rule is not associated with a last subset number in the sequence; and the operations further comprise sending an error message to a client device of the system, the error message indicating that an endless loop has been detected.

Example 4 the system of any of examples 1-3, wherein each of the rules, of the set of rules, comprises an "if" statement including an expression dependent on a fact and a "then" statement specifying an action to be performed when executing the rule; and a rule, of the set of rules, is triggered based on the expression of the "if" statement being satisfied by an updated fact.

Example 5 the system of example 4, wherein the action specified by the "then" statement includes updating a fact.

Example 6 the system of example 2, wherein the operations further comprise: (f) storing with each identifier for an executed rule, using the processor, a fact which satisfies the expression of the "if" statement of the executed rule; (g) associating each stored fact with the same subset number, in the sequence, that is associated with the identifier that the fact is stored with; and repeating steps (a)-(g) until: the identifier for a rule, to be executed, is associated with a number of subset numbers that are offset from each other in the sequence by a same offset value and the number exceeds the loop threshold value; and the expression of the "if" statement of the rule is satisfied based on a same fact that is stored together with the identifier for the rule in association with a subset number in the sequence.

Example 7 the system of any of examples 1-6, wherein updating at least one of the facts includes inserting and/or deleting facts from the database, and the operations further comprise repeating steps (a)-(e) until a number of the facts or an amount of memory of the database storing the facts exceeds a fact threshold value.

Example 8 the system of example 7, wherein a number of the facts or an amount of memory of the database storing the facts exceeds the fact threshold value; and the operations further comprise sending an error message to a client device of the system, the error message indicating that a fact limit has been exceeded.

Example 9 the system of example 8, wherein a number of the facts or an amount of memory of the database storing the facts exceeds a specified percentage of the fact threshold value; and the operations further comprise sending a warning message to a client device of the system, the warning message indicating that the fact limit is being approached.

Example 10 the system of example 7, wherein the identifier for a rule, to be executed, is associated with a number of subset numbers that are offset from each other in the sequence by a same offset value and the number does not exceed the loop threshold value; a number of the facts or an amount of memory of the database storing the facts exceeds the fact threshold value; and the operations further comprise sending an error message to a client device of the system, the error message indicating that the fact limit has been exceeded and a detected loop may be a cause of the exceedance.

Example 11 the system of any of examples 1-10, wherein the subset comprises a scheduled rule that is executed based on a scheduled time period elapsing after the rule is triggered and, based on the scheduled time period elapsing, the operations further comprise: removing all subset numbers from the sequence, using the processor, before executing the scheduled rule using the inference engine.

Example 12 a computerized method for detecting an endless loop in an inference engine processing a set of rules according to facts stored in a database, the method comprising: (a) analyzing the set of rules, using the inference engine, to identify a subset of the set of rules, the subset comprising rules that are triggered by an updated fact of the facts; (b) executing the rules of the subset using the inference engine; (c) updating, using the inference engine, at least one of the facts based on the execution of the rules of the subset; (d) storing, using the processor, an identifier for each executed rule of the subset; (e) associating, using the processor, each stored identifier with a subset number for the subset in a consecutive sequence of subset numbers for executed subsets; and repeating steps (a)-(e) until the identifier for a rule, to be executed, is associated with a number of subset numbers that are offset from each other in the sequence by a same offset value and the number exceeds a loop threshold value.

Example 13 the method of example 12, further comprising: repeating steps (a)-(e) until: the identifier for a rule, to be executed, is associated with a number of subset numbers that are offset from each other in the sequence by a same offset value and the number exceeds the loop threshold value; and the identifier for the rule is not associated with a subset number of a last subset in the sequence.

Example 14 the method of example 13, wherein the identifier for a rule, to be executed, is associated with a number of subset numbers that are offset from each other in the sequence by a same offset value and the number exceeds the loop threshold value; the identifier for the rule is not associated with a last subset number in the sequence; and the operations further comprise sending an error message to a client device of the system, the error message indicating that an endless loop has been detected.

Example 15 the method of any of examples 12-14, wherein updating at least one of the facts includes inserting and/or deleting facts from the database; and the method further comprises repeating steps (a)-(e) until a number of the facts or an amount of memory of the database storing the facts exceeds a fact threshold value.

Example 16 the method of example 15, wherein a number of the facts or an amount of memory of the database storing the facts exceeds the fact threshold value; and the method further comprises sending an error message to a client device of the system, the error message indicating that a fact limit has been exceeded.

Example 17 the method of example 16, wherein a number of the facts or an amount of memory of the database storing the facts exceeds a specified percentage of the fact threshold value; and the operations further comprise sending a warning message to a client device of the system, the warning message indicating that the fact limit is being approached.

Example 18 the method of example 15, wherein the identifier for a rule, to be executed, is associated with a number of subset numbers that are offset from each other in the sequence by a same offset value and the number does not exceed the loop threshold value; a number of the facts or an amount of memory of the database storing the facts exceeds the fact threshold value; and the method further comprises sending an error message to a client device of the system, the error message indicating that a fact limit has been exceeded and a detected loop may be a cause of the exceedance.

Example 19 the method of any of examples 12-18, wherein the subset comprises a scheduled rule that is executed based on a scheduled time period elapsing after the rule is triggered and, based on the scheduled time period elapsing, the method further comprises: removing all subset numbers from the sequence, using the processor, before executing the scheduled rule using the inference engine.

Example 20 a non-transitory machine-readable storage medium storing instructions which, when executed by at least one processor of a machine, cause the machine to perform operations for detecting an endless loop in an inference engine processing a set of rules according to facts stored in a database, the operations comprising: (a) analyzing the set of rules, using the inference engine, to identify a subset of the set of rules, the subset comprising rules that are triggered by an updated fact of the facts. (b) executing the rules of the subset using the inference engine; (c) updating, using the inference engine, at least one of the facts based on the execution of the rules of the subset; (d) storing, using the processor, an identifier for each executed rule of the subset; (e) associating, using the processor, each stored identifier with a subset number for the subset in a consecutive sequence of subset numbers for executed subsets; and repeating steps (a)-(e) until the identifier for a rule, to be executed, is associated with a number of subset numbers that are offset from each other in the sequence by a same offset value and the number exceeds a loop threshold value.

Example 21 the non-transitory machine-readable storage medium of example 20 further storing instructions which, when executed by the at least one processor, cause the machine to perform operation comprising the operations of the method of any of examples 12-19.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-8 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art may readily understand how to implement the subject matter in different contexts from the disclosure contained herein.

Software Architecture

Figure 9:
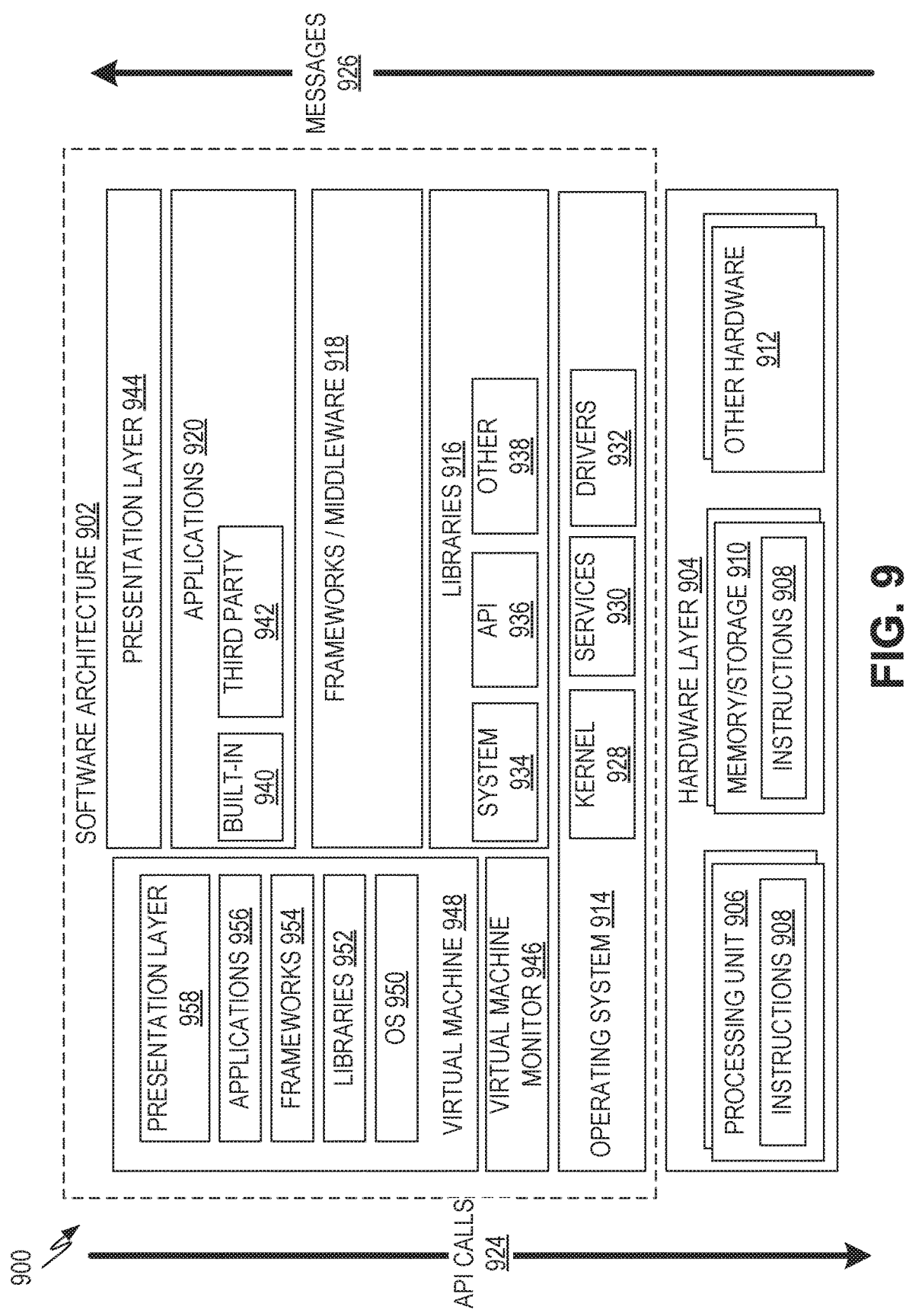
FIG. 9 is a block diagram illustrating an example of a software architecture that may be installed on a machine, according to some example embodiments.

FIG. 9 is a block diagram 900 illustrating an example of a software architecture 902 that may be installed on a machine, according to some example embodiments. FIG. 9 is merely a non-limiting example of a software architecture, and it will be appreciated that many other architectures may be implemented to facilitate the functionality described herein. The software architecture 902 may be executing on hardware such as a machine 1000 of FIG. 10 that includes, among other things, processors 1010, memory/storage 1030, and I/O components 1050. A representative hardware layer 904 is illustrated and may represent, for example, the machine 1000 of FIG. 10. The representative hardware layer 904 comprises one or more processing units 906 having associated executable instructions 908. The executable instructions 908 represent the executable instructions of the software architecture 902, including implementation of the methods, modules, and so forth of FIGS. 1-8. The hardware layer 904 also includes memory or storage modules 910, which also have the executable instructions 908. The hardware layer 904 may also comprise other hardware 912, which represents any other hardware of the hardware layer 904, such as other hardware illustrated as part of machine 1000.

In the example architecture of FIG. 9, the software architecture 902 may be conceptualized as a stack of layers, where each layer provides particular functionality. For example, the software architecture 902 may include layers such as an operating system 914, libraries 916, frameworks, middleware 918, applications 920, and a presentation layer 944. Operationally, the applications 920 or other components within the layers may invoke API calls 924 through the software stack and receive a response, returned values, and so forth (illustrated as messages 926) in response to the API calls 924. The layers illustrated are representative in nature, and not all software architectures have all layers. For example, some mobile or special purpose operating systems may not provide a frameworks/middleware 918 layer, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than by interfacing directly with the underlying operating system 914 functionality (e.g., kernel 928, services 930, or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media formats such as MPEG4, H.264, MP3, AAC, AMR, JPG. PNG), graphics libraries (e.g., an OpenGL framework that may be used to render 2D and 3D graphic content on a display), database libraries (e.g., SQLite, which may provide various relational database functions), web libraries (e.g., WebKit, which may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, or a game application. The third-party applications 942 may include any of the built-in applications 940, as well as a broad assortment of other applications. In a specific example, a third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party applications 942 may invoke the API calls 924 provided by the mobile operating system, such as the operating system 914, to facilitate functionality described herein.

The applications 920 may utilize built-in operating system functions (e.g., kernel 928, services 930, or drivers 932), libraries (e.g., system libraries 934, API libraries 936, and other libraries 938), or frameworks/middleware 618 to create user interfaces to interact with users of the system. Alternatively, or additionally, in some systems, interactions with a user may occur through a presentation layer, such as the presentation layer 944. In these systems, the application/module "logic" may be separated from the aspects of the application/module that interact with the user.

Some software architectures utilize virtual machines. In the example of FIG. 9, this is illustrated by a virtual machine 948. A virtual machine creates a software environment where applications/modules may execute as if they were executing on a hardware machine (e.g., the machine 1000 of FIG. 10, for example). A virtual machine 948 is hosted by a host operating system (e.g., operating system 914) and typically, although not always, has a virtual machine monitor 946, which manages the operation of the virtual machine 948 as well as the interface with the host operating system (e.g., operating system 914). A software architecture executes within the virtual machine 948, such as an operating system 950, libraries 952, frameworks/middleware 954, applications 956, and a presentation layer 958. These layers of software architecture executing within the virtual machine 948 may be the same (or different) as corresponding layers previously described.

Machine Architecture and Machine-Readable Medium

Figure 10:
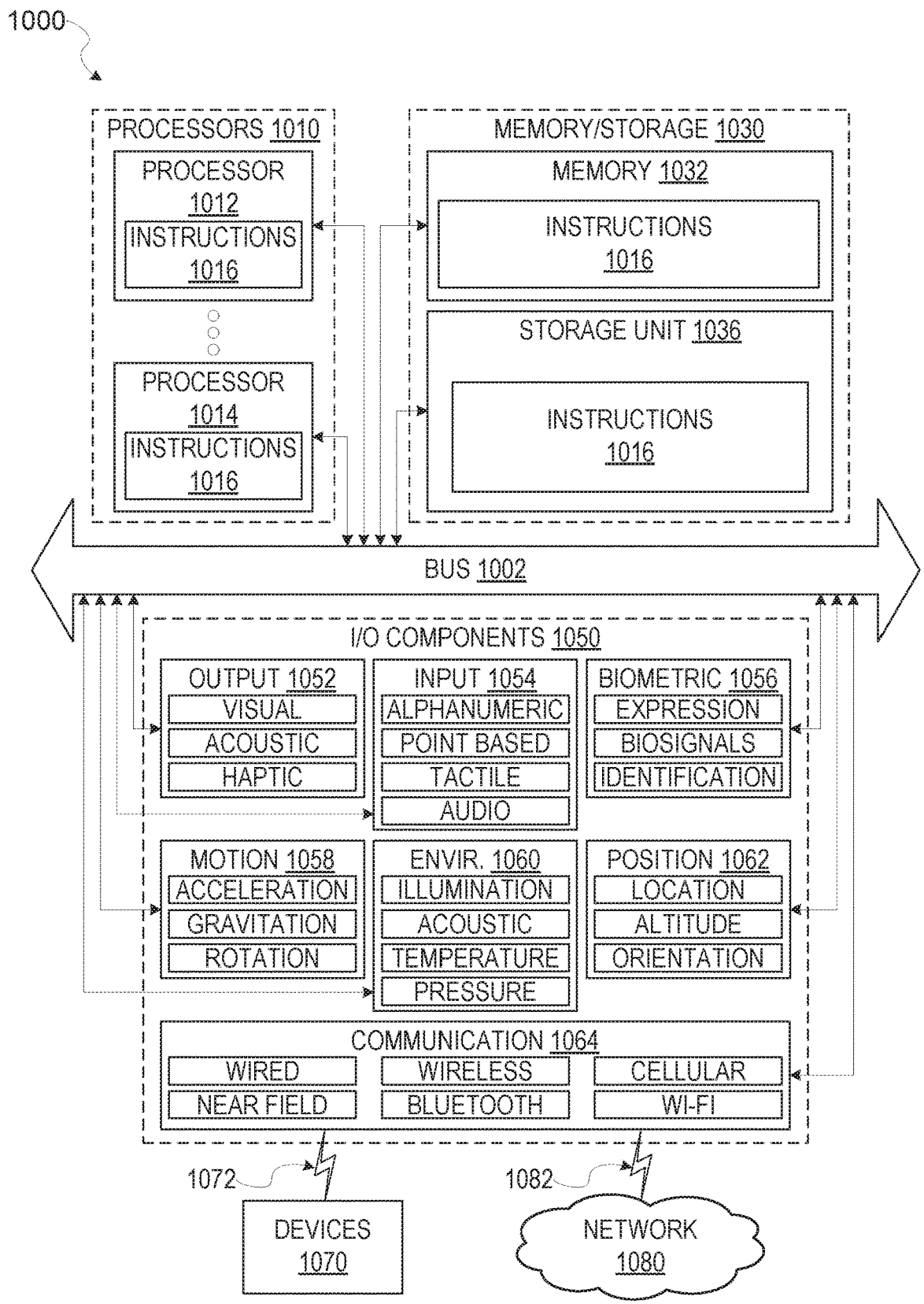
FIG. 10 illustrates a diagrammatic representation of a machine in the form of a computer system within which a set of instructions may be executed for causing the machine to perform any one or more of the methodologies discussed herein.

FIG. 10 illustrates a diagrammatic representation of a machine in the form of a computer system within which a set of instructions may be executed for causing the machine to perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example the instructions 1016 may cause the machine 1000 to execute the method 400 of FIG. 4. Additionally, or alternatively, the instructions 1016 may implement the methods of FIGS. 5-8. The instructions 1016 transform the general, non-programmed machine 1000 into a particular machine 1000 programmed to carry out the described and illustrated functions as described.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory/storage 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination of processors and cores.

The memory/storage 1030 may include a memory 1032, such as a main memory, or other memory storage, and a storage unit 1036, both accessible to the processors 1010 such as via the bus 1002. The storage unit 1036 and the memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine (e.g., processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1080 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX). Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter described herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to such claims.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
a hardware processor;
a database storing a plurality of facts;
an inference engine configured to process a set of rules; and
a memory including instructions which, when executed by the processor, cause the system to perform operations comprising:
   detecting an update made to a first fact of the plurality of facts;
   identifying a subset of the set of rules that are triggered by the updated first fact of the plurality of facts;
   executing rules of the subset of the set of rules that are triggered by the updated first fact of the plurality of facts;
   storing an identifier for each executed rule in the subset of rules that are triggered by the updated first fact of the plurality of facts;
   associating each stored identifier with a subset number for the subset in a consecutive sequence of subset numbers for executed subsets;
   determining that a first executed rule of the subset of the set of rules is associated with a number of subset numbers that are offset from each other in the consecutive sequence of subset numbers for executed subsets by a same offset value;
   determining whether the number of subset numbers exceeds a threshold loop value;
   based on determining that the number of subset numbers exceeds a threshold loop value, blocking further execution of the subset of rules and generating an error message indicating a reason the execution is blocked;
   based on determining that the number of subset numbers does not exceed a threshold loop value:
      calculating a number of facts that were added and deleted based on the execution of the rules of the subset of the set of rules to determine a total number of facts;
   determining whether the total number of facts exceeds a fact threshold value based on the number of facts that were added and deleted; and
   blocking new requests for rule execution based on determining that the total number of facts exceeds the fact threshold value.

2. The system of claim 1, wherein blocking the further execution of the subset of rules and generating an error message indicating a reason execution is blocked is further based on determining that the first rule has not been executed in a previously executed subset of the set of rules.

3. The system of claim 2, the operations further comprising:
sending the generated error message to a client device of the system, the error message indicating that an endless loop has been detected.

4. The system of claim 1, wherein:
each rule of the set of rules comprises an "if" statement including an expression dependent on a fact and a "then" statement specifying an action to be performed when executing the rule; and
a rule, of the set of rules, is triggered based on the expression of the "if" statement being satisfied by an updated fact.

5. The system of claim 4, wherein the action specified by the "then" statement includes updating a fact.

6. The system of claim 4, wherein the operations further comprise:
   storing a fact which satisfies the expression of the "if" statement of the executed rule, with an identifier for the executed rule;
   associating each stored fact with the same subset number, in the sequence, that is associated with the identifier that the fact is stored with; and
   wherein blocking the further execution of the subset of rules and generating an error message indicating a reason execution is blocked is further based on determining that the expression of the "if" statement of the rule is satisfied based on a same fact that is stored together with the identifier for the rule in association with a subset number in the sequence.

7. The system of claim 1, the operations further comprising:
   generating an error message indicating that the fact threshold value has been exceeded.

8. The system of claim 1, wherein the subset of rules comprises a scheduled rule that is executed based on a scheduled time period elapsing after the rule is triggered and, based on the scheduled time period elapsing, the operations further comprise:
   removing all subset numbers from the sequence before executing the scheduled rule using the inference engine.

9. The system of claim 1, the operations further comprising:
   receiving an indication that the first rule was updated in response to the generated error message indicating a reason execution is blocked; and
   in response to the received indication, unblocking execution of the subset of rules.

10. The system of claim 1, wherein after determining whether the number of subset numbers exceeds a threshold loop value, the operations comprise:
    determining whether a same fact that is stored together with an identifier of the first rule satisfies the first rule; and
    wherein blocking the further execution of the subset of the rules and generating an error message indicating a reason the execution is blocked is further based on determining that a same fact that is stored together with an identifier of the first rule satisfies the first rule.

11. The system of claim 1, wherein the threshold fact value is a specified percentage of a fact threshold value.

12. A computerized method for detecting an endless loop in an inference engine processing a set of rules according to a plurality of facts stored in a database, the method comprising:
    detecting an update made to a first fact of the plurality of facts;
    identifying a subset of the set of rules that are triggered by the updated first fact of the plurality of facts;
    executing rules of the subset of the set of rules that are triggered by the updated first fact of the plurality of facts;
    storing an identifier for each executed rule in the subset of rules that are triggered by the updated first fact of the plurality of facts;
    associating each stored identifier with a subset number for the subset in a consecutive sequence of subset numbers for executed subsets;
    determining that a first executed rule of the subset of the set of rules is associated with a number of subset numbers that are offset from each other in the consecutive sequence of subset numbers for executed subsets by a same offset value;
    determining whether the number of subset numbers exceeds a threshold loop value;
    based on determining that the number of subset numbers exceeds a threshold loop value, blocking further execution of the subset of rules and generating an error message indicating a reason the execution is blocked;
    based on determining that the number of subset numbers does not exceed a threshold loop value:
       calculating a number of facts that were added and deleted based on the execution of the rules of the subset of the set of rules to determine a total number of facts;
       determining whether the total number of facts exceeds a fact threshold value based on the number of facts that were added and deleted; and
       blocking new requests for rule execution based on determining that the total number of facts exceeds the fact threshold value.

13. The method of claim 12, wherein blocking the further execution of the subset of rules and generating an error message indicating a reason execution is blocked is further based on determining that the first rule has not been executed in a previously executed subset of the set of rules.

14. The method of claim 12, further comprising:
    generating an error message indicating that the fact threshold value has been exceeded.

15. The method of claim 12, wherein the subset of rules comprises a scheduled rule that is executed based on a scheduled time period elapsing after the rule is triggered and, based on the scheduled time period elapsing, the operations further comprise:
    removing all subset numbers from the sequence before executing the scheduled rule using the inference engine.

16. The method of claim 12, further comprising:
    sending the generated error message to a client device of the system, the error message indicating that an endless loop has been detected.

17. The method of claim 12, wherein:
    each rule of the set of rules comprises an "if" statement including an expression dependent on a fact and a "then" statement specifying an action to be performed when executing the rule; and
    a rule, of the set of rules, is triggered based on the expression of the "if" statement being satisfied by an updated fact.

18. The method of claim 17, wherein the action specified by the "then" statement includes updating a fact.

19. The method of claim 17, further comprising:
    storing a fact which satisfies the expression of the "if" statement of the executed rule, with an identifier for the executed rule;
    associating each stored fact with the same subset number, in the sequence, that is associated with the identifier that the fact is stored with; and
    wherein blocking the further execution of the subset of rules and generating an error message indicating a reason execution is blocked is further based on determining that the expression of the "if" statement of the rule is satisfied based on a same fact that is stored together with the identifier for the rule in association with a subset number in the sequence.

20. A non-transitory machine-readable storage medium storing instructions which, when executed by at least one processor of a machine, cause the machine to perform operations for detecting an endless loop in an inference engine processing a set of rules according to a plurality of facts stored in a database, the operations comprising:

detecting an update made to a first fact of the plurality of facts;

identifying a subset of the set of rules that are triggered by the updated first fact of the plurality of facts;

executing rules of the subset of the set of rules that are triggered by the updated first fact of the plurality of facts;

storing an identifier for each executed rule in the subset of rules that are triggered by the updated first fact of the plurality of facts;

associating each stored identifier with a subset number for the subset in a consecutive sequence of subset numbers for executed subsets;

determining that a first executed rule of the subset of the set of rules is associated with a number of subset numbers that are offset from each other in the consecutive sequence of subset numbers for executed subsets by a same offset value;

determining whether the number of subset numbers exceeds a threshold loop value;

based on determining that the number of subset numbers exceeds a threshold loop value, blocking further execution of the subset of rules and generating an error message indicating a reason the execution is blocked;

based on determining that the number of subset numbers does not exceed a threshold loop value:

calculating a number of facts that were added and deleted based on the execution of the rules of the subset of the set of rules to determine a total number of facts;

determining whether the total number of facts exceeds a fact threshold value based on the number of facts that were added and deleted; and blocking new requests for rule execution based on determining that the total number of facts exceeds the fact threshold value.

\* \* \* \* \*